United States Patent
Matzen

(10) Patent No.: US 8,408,070 B2
(45) Date of Patent: Apr. 2, 2013

(54) ELECTROMAGNETIC FLOWMETER AND METHOD INCORPORATING THE SAME

(75) Inventor: Steen Moellebjerg Matzen, Sydals (DK)

(73) Assignee: Siemens Aktiengesellschaft, Munich (DE)

( * ) Notice: Subject to any disclaimer, the term of this patent is extended or adjusted under 35 U.S.C. 154(b) by 148 days.

(21) Appl. No.: 12/996,361

(22) PCT Filed: Jun. 5, 2008

(86) PCT No.: PCT/EP2008/004504
§ 371 (c)(1),
(2), (4) Date: Jun. 9, 2011

(87) PCT Pub. No.: WO2009/146724
PCT Pub. Date: Dec. 10, 2009

(65) Prior Publication Data
US 2012/0031196 A1    Feb. 9, 2012

(51) Int. Cl.
*G01F 1/58*    (2006.01)

(52) U.S. Cl. .................................................... 73/861.12
(58) Field of Classification Search ... 73/861.11–861.15
See application file for complete search history.

(56) References Cited

U.S. PATENT DOCUMENTS

| | | | | |
|---|---|---|---|---|
| 7,137,307 | B2 * | 11/2006 | Huybrechts et al. | 73/861.12 |
| 7,472,605 | B2 * | 1/2009 | Knill et al. | 73/861.12 |
| 7,735,379 | B2 * | 6/2010 | Glauser | 73/861.12 |

FOREIGN PATENT DOCUMENTS

EP    1 108 989    6/2001

* cited by examiner

*Primary Examiner* — Jewel V Thompson
(74) *Attorney, Agent, or Firm* — Cozen O'Connor

(57) ABSTRACT

An electromagnetic flowmeter for measuring the flow of a medium through a measuring pipe, wherein the flowmeter includes first and second electrodes arranged on opposite sides of the measuring pipe and coupled electrically or capacitively to the medium. A common mode test signal is passed to the first and second electrodes. A third electrode is provided at the top of the measuring pipe for receiving a response signal in response to the test signal passed to the first and second electrodes. The flowmeter also includes a detection device for detecting whether the third electrode is in contact with the medium based on the response signal.

13 Claims, 4 Drawing Sheets

ELECTROMAGNETIC FLOWMETER AND METHOD INCORPORATING THE SAME

CROSS-REFERENCE TO RELATED APPLICATIONS

This is a U.S. national stage of International Application No. PCT/EP2008/004504, filed on 5 Jun. 2008. The entire content of which application is incorporated herein by reference.

BACKGROUND OF THE INVENTION

1. Field of the Invention

The present invention relates to an electromagnetic flowmeter for measuring the flow rate of a fluid in a pipe and, more particularly, to full pipe detection in an electromagnetic flowmeter.

2. Description of the Related Art

Electromagnetic flowmeters utilize the principle of electrodynamic induction for flow rate measurement of a fluid medium. In an electromagnetic flowmeter, a magnetic field is generated across a measuring section of the flowmeter pipe through which the medium flows, which by operation of Faraday's law, generates a voltage orthogonal to both the flow of the medium and the magnetic field. The induced voltage is measured by a pair of electrodes on opposite sides of the measuring section. This induced voltage is proportional to the flow velocity of the medium to be measured and averaged over the cross section of the pipe.

Considerable measurement errors can occur if the measuring pipe is not filled completely but only partially with the medium to be measured, because the measuring apparatus bases the resultant measurements on a completely filled measuring pipe. In addition to incompleteness of the measuring pipe, factors such as gas bubbles in the medium, corrosion of electrodes, liner damage, electrode fouling, among others, also lead to measurement errors.

SUMMARY OF THE INVENTION

It is therefore an object of the present invention to provide an improved electromagnetic flowmeter.

This and other objects and advantages are achieved in accordance with the invention by an electromagnetic flowmeter for measuring the flow of a medium through a measuring pipe which comprises first and second electrodes arranged on opposite sides of the measuring pipe and coupled electrically or capacitively to the medium, a device for passing a test signal as a common mode signal to the first and second electrodes, a third electrode arranged at the top of said measuring pipe for receiving a response signal in response to the test signal that is passed to the first and second electrodes, and a detection device for detecting whether the third electrode is in contact with the medium based upon the response signal.

The above object is also achieved by a method for measuring flow of a medium through a measuring pipe which comprises passing a test signal as a common mode signal to first and second electrodes that are arranged on opposite sides of the measuring pipe and are coupled electrically or capacitively to the medium, measuring a response signal received at a third electrode arranged at the top of said measuring pipe in response to the test signal passed to the first and second electrodes, and detecting whether the third electrode is in contact with the medium based upon the response signal.

The underlying idea of the present invention is to perform full pipe detection on an electromagnetic flowmeter without major changes in the existing circuitry for flow detection and electrode impedance measurement. The proposed full pipe detection works further for remote installation and with very high/low media conductivity.

In a preferred embodiment, the test signal comprises a sequence of symmetrical pulses whose average value over a flow detection period is zero. This ensures that the flow measurements are not disturbed by the test signal.

In a still preferred embodiment, the detection device for detecting whether the third electrode is in contact with the medium is based upon a comparison of the electrode-to-ground impedance determined for the third electrode with electrode-to-ground-impedance of at least one of the first and second electrodes. As a result, a higher reliability is provided in detecting a full pipe with different media conductivities. In an exemplary embodiment, the flowmeter further comprises a measuring device for measuring electrode-to-ground impedance for the first electrode, where the measuring device for measuring electrode-to-ground impedance for the first electrode further comprises a device for passing the test signal to the first electrode, a device for terminating the response signal from the third electrode to ground, and device for measuring a potential difference between the first and the second electrode in response to the test signal passed to the first electrode. Electrode impedance measurement is useful in gauging various parameters, such as conductivity of the medium, gas bubbles in the medium, corrosion of electrodes fouling of electrodes or liner damage. The presently contemplated embodiment facilitates electrode impedance measurement and full pipe detection using the same detection circuitry.

In an exemplary embodiment, the third electrode is terminated to ground by a resistor to effectively determine the electrode-to-ground impedance of the third electrode, where the electrode-to-ground impedance of the third electrode is determined by measuring a voltage across the resistor. The resistor also serves to terminate the input when the third electrode is not in contact with the medium, thus minimizing the noise due to stray currents.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF DRAWINGS

The present invention is further described hereinafter with reference to illustrated embodiments shown in the accompanying drawings, in which.

DETAILED DESCRIPTION OF THE PREFERRED EMBODIMENTS

Figure 1:
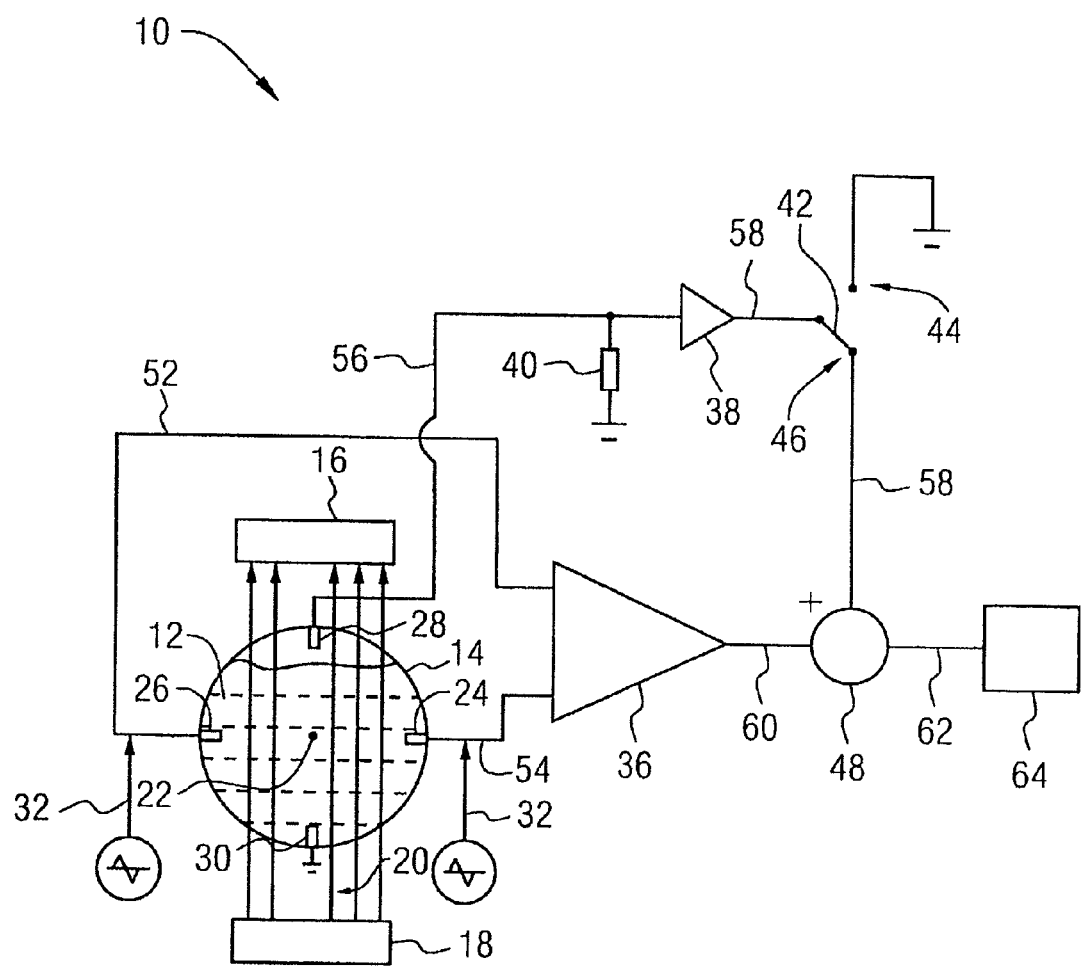
FIG. 1 is a schematic block diagram of an electromagnetic flowmeter in accordance with an embodiment of the invention.

An electromagnetic flowmeter apparatus according to one embodiment of the present invention is now illustrated with reference to FIG. 1. A fluid medium 12, whose flow rate is to be measured, flows through a measuring pipe 14, along the direction of the axis 22 of the measuring pipe 14. The medium 12 to be measured is electrically conductive, at least to a slight extent.

The flowmeter includes a pair of electrodes 24 and 26 arranged on opposite sides of the measuring pipe 14 and coupled electrically or capacitively to the medium 12. A magnetic arrangement is provided including electromagnets 16 and 18 that generate a pulsed magnetic field, oriented perpendicularly to the flow direction of the medium 12. In an exemplary embodiment, the magnetic field is a quasi stationary DC magnetic field having a frequency of 6. Hz for a mains supply of 50 Hz, or a frequency of 7.5 Hz for a mains supply of 60 Hz. Due to this magnetic field, charge carriers in the medium 12 migrate to the electrodes 24 and 26 of opposite polarity. The potential difference which builds up across the electrodes 24 and 26 is proportional to the flow velocity of the medium 12 averaged over the cross-sectional area of the measuring pipe 14. A differential amplifier 36 amplifies this potential difference (i.e., the difference in the signals 54 and 52 from the electrodes 24 and 26, respectively) and provides the amplified output 60 to flow detection circuitry 64.

The flow detection circuitry 64 calibrates the output 60 of the differential amplifier 36 to units of flow velocity or flow rate, and provides an output to output circuitry (not shown). In the illustrated example, the electrodes are in direct contact with the medium 12 to be measured. However, the coupling may also be of a capacitive nature.

As previously described, since the flowmeter bases the measuring results that are yielded by it on a completely filled measuring pipe 14, considerable measurement errors can occur if the measuring pipe 14 is not filled completely but only partially with the medium 12 to be measured as shown in FIG. 1 For the purpose of detecting whether the measuring pipe 14 is completely filled, a third electrode 28 is provided at the top of the measuring pipe 14. The impedance of the top electrode 28 to ground is indicative of whether the top electrode 28 is wetted by (i.e., in contact with) the medium 12. A fourth electrode 30 is provided at the bottom of the measuring pipe 14 and is grounded. A test signal 32 is passed to the electrodes 24 and 26 as a common mode signal, for example, by two capacitors (constant current source). In an exemplary embodiment, the test signal 32 is a pulsed current signal, comprising a sequence of symmetrical pulses such that the average value of the test signal 32 is zero over a flow detection period. This ensures that the flow measurements are not disturbed by the test signal 32. In a preferred embodiment, the pulses have a repetition rate (i.e., pulse frequency) above a corner frequency (for example, above 0 Hz) to ensure that electrode impedance measurements at that frequency are asymptotically equal to the theoretical value of media impedance. For example, in case of a magnetic field frequency of 6 Hz for a mains supply of 50 Hz, the flow detection period is taken to be milliseconds. In case of a magnetic field frequency of 7.5 Hz for a mains supply of 60 Hz, the flow detection period is taken to be 16.67 milliseconds. In the above examples, the test signal 32 may have a pulse frequency 400 Hz for a magnetic field frequency of 6 Hz, or a pulse frequency 480 Hz for a magnetic field of frequency 7.5 Hz. The test signal 32 passed to the electrodes 24 and 26 is transformed into voltage in the medium 12, which appears as a response signal 56 at the top electrode 28. Since the test signal 32 appears at the electrodes 24 and 26 as a common mode signal that is rejected by the differential amplifier 36, the output 60 of the differential amplifier 36 comprises essentially a flow velocity measurement signal.

The top electrode is terminated to ground by a resistor 40. The voltage induced response signal 56 at the top electrode 28 forces a current into the resistor 40 through the electrode-to-ground impedance of the top electrode 28. The electrode-to-ground impedance of the top electrode 28, which is different than zero, may be measured only when the top electrode is in contact with the medium 12. With no media contact at the top electrode 28, no signal is transferred to the resistor 40 that appears as very low impedance (in theory, zero impedance) to the detection circuitry, which thus detects an incompletely filled pipe. The resistor 40 further serves the purpose of terminating the input when the top electrode 28 is not in contact with the medium 12, thus minimizing noise due to stray currents. The electrode-to-ground impedance of the top electrode 28 is determined from a ratio of difference of the positive and negative values of the detected voltage across the resistor 40 over a flow detection period of milliseconds for a 50 Hz system, and 16.67 milliseconds for a 60 Hz system) to the current from the test signal 32.

As shown in FIG. 1, the detected voltage across the resistor 40 is buffered by a buffer amplifier 38. Summation circuitry 48 is provided for summing the output 58 of the buffer amplifier 38 with the output 60 of the differential amplifier 36. The output 62 of the summation circuitry 48 thus comprises a top electrode impedance signal superimposed on the flow velocity measurement signal. This output 62 is transmitted to the flow detection circuitry 64 for simultaneous measurement of flow velocity as well as full pipe detection based top electrode impedance measurement as described above.

The electrode-to-ground impedance of the top electrode 28 depends on the conductivity of the medium 12. To ensure a higher reliability in detecting a full pipe with media having different conductivities, the full pipe detection is performed based on a comparison of the electrode-to-ground impedance determined for the top electrode 28 with the electrode-to-ground-impedances of at least one of the electrodes 24 and 26. If the electrode-to-ground impedance of the top electrode 28 is comparable to, or lies within predetermined tolerances around electrode-to-ground impedance of the electrodes 24 and 26, it is an indication that the top electrode 28 is in contact with the medium (if the measuring pipe 14 is completely filled). If the electrode-to ground impedance of the top electrode 28 is significantly lesser than the electrode-to-ground impedance of the first and second electrodes 24 and 26, it is an indication that the top electrode 28 is not in contact with the medium 12 (i.e., the measuring pipe 14 is not completely filled).

Figure 2:
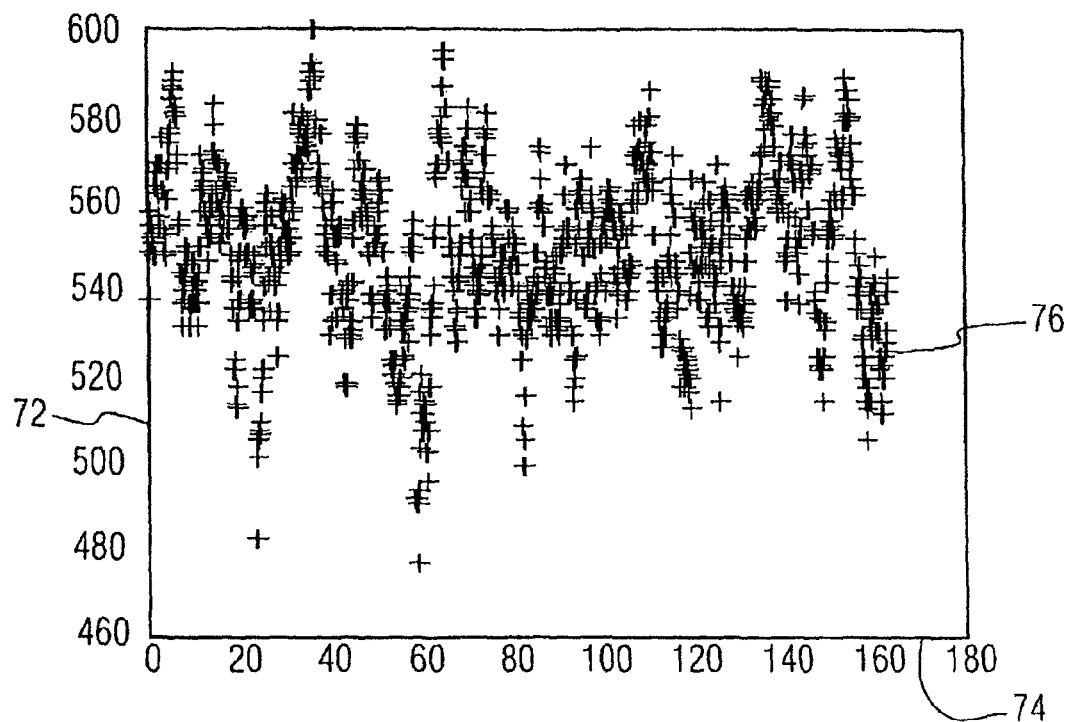
FIG. 2 is an exemplary graphical plot of an impedance measurement of the top electrode when the medium is potable water and the measuring pipe is full.
Figure 3:
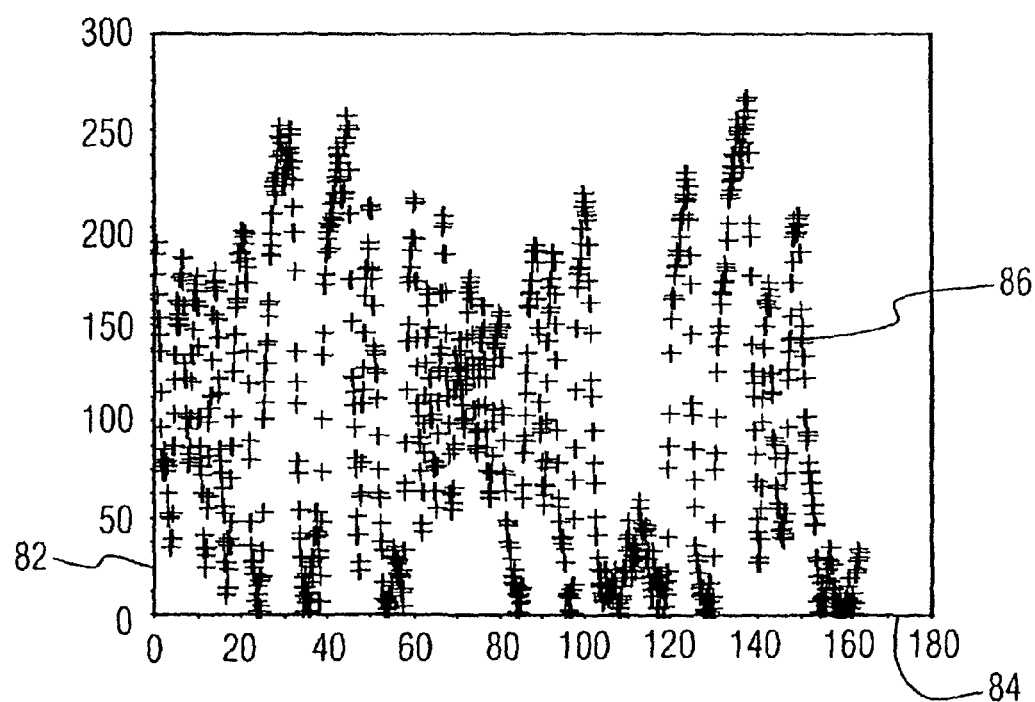
FIG. 3 is an exemplary graphical plot of an impedance measurement of the top electrode when the medium is potable water and the measuring pipe is not full.
Figure 4:
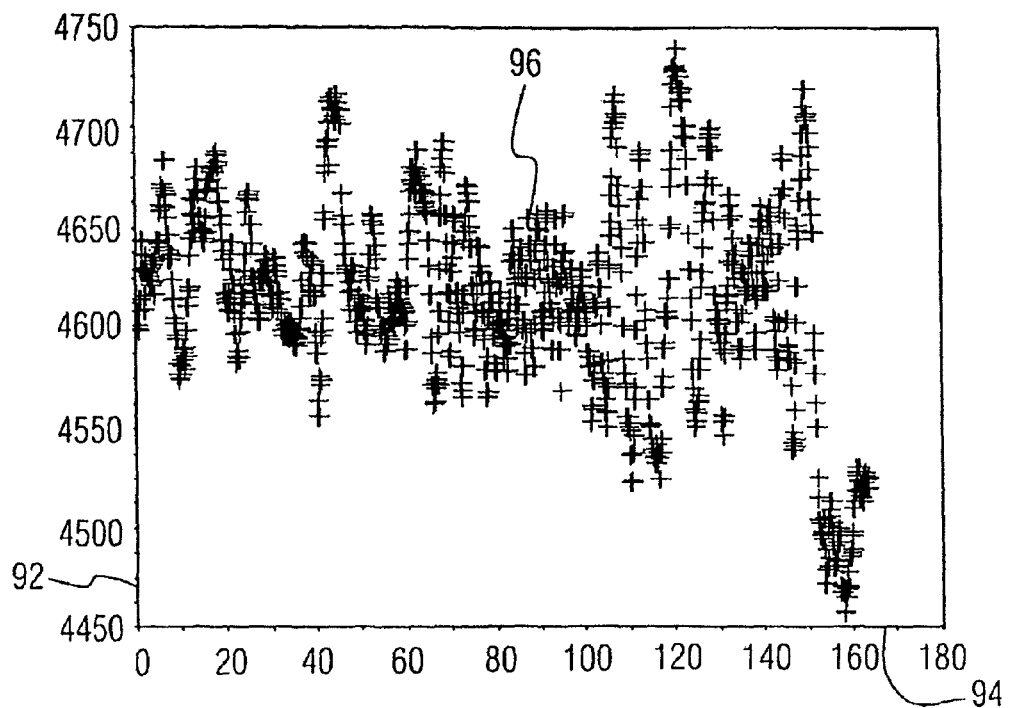
FIG. 4 is an exemplary graphical plot of an impedance measurement of the top electrode when the medium is demineralized water and the measuring pipe is full.
Figure 5:
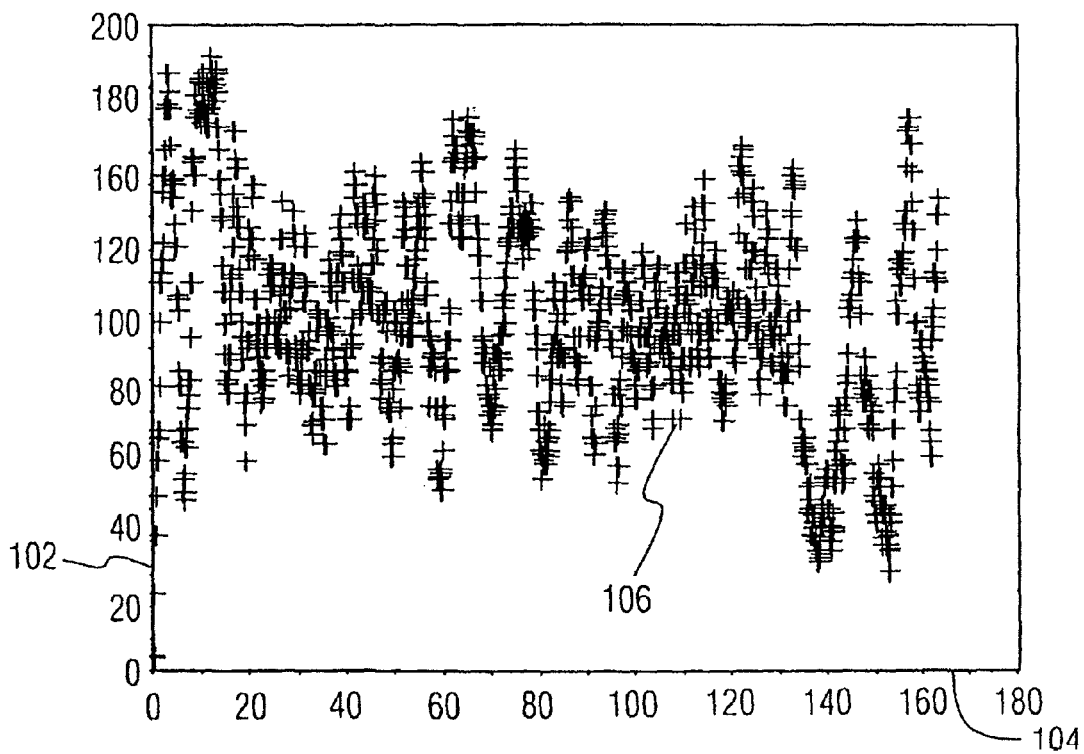
FIG. 5 is an exemplary graphical plot of an impedance measurement of the top electrode when the medium is demineralized water and the measuring pipe is not full.

FIGS. 2-5 illustrate the variation of the top electrode impedance with varying media conductivities. In FIG. 2, an exemplary plot 76 of the electrode-to-ground impedance (in ohms) of the top electrode (represented along an axis 72) with time in seconds (represented along an axis 74) is shown, where the medium is potable water and the measuring pipe is completely full. The mean impedance as calculated from this plot is 549.96 ohms. In FIG. 3, a graphical plot 86 of the electrode-to-ground impedance (in ohms) of the top electrode (represented along an axis 82) with time in seconds (represented along an axis 84) is shown in a scenario when the measuring pipe is not completely full, the medium being the same, i.e. potable water. Here, the calculated mean impedance is 1.86 ohms. As appreciable from the plot, be seen the electrode-to-ground impedance of the top electrode is greatly reduced when the top electrode is not in contact with the medium. However, as illustrated in FIGS. 4 and 5, the measured electrode-to-ground impedance of the top electrode is significantly higher when a medium of lower conductivity, such as demineralized water, is used. In FIG. 4, an exemplary graphical plot 96 of the electrode-to-ground impedance (in ohms) of the top electrode (represented along an axis 92) with time in seconds (represented along an axis 94) is shown, where the medium is demineralized water and the measuring pipe is completely full. The mean impedance as calculated from this plot is 4615.96 ohms. In FIG. 5, a plot 6 of the electrode-to-ground impedance (in ohms) of the top electrode (represented along an axis 2) with time in seconds (represented along an axis 4) is shown in a scenario when the measuring pipe is not completely full, the medium being the same, i.e., demineralized water. Here, the calculated mean impedance is 8.83 ohms. In order to detect a full pipe even with very high/low conductivities, the information on the electrode impedance can be used for adapting the full pipe detection level to the actual media conductivity. The information on electrode impedance of the top electrode can be further used for detecting small air bubbles gathered at the top of the flowmeter. This will show as an increased noise level in the top electrode impedance measurement.

Returning to FIG. 1, in order to determine the electrode-to-ground impedance of the electrode 24, a test signal (typically, a current signal) is injected at only the electrode 24 and the differential voltage between the electrodes 24 and 26 created at the differential amplifier 36 is measured. The electrode-to ground impedance of the electrode 24 is determined by calculating a ratio of the differential voltage between the electrodes 24 and 26 and the current at the test signal. Likewise, in order to determine the electrode-to-ground impedance of the electrode 26, a test signal (typically, a current signal) is injected at only the electrode 26 and the differential voltage between the electrodes 26 and 24 created at the differential amplifier 36 is measured. The electrode-to-ground impedance of the electrode 26 is determined by calculating a ratio of the differential voltage between the electrodes 26 and 24 and the current at the test signal. A switching device 42 is adapted to terminate the output signal 58 of the buffer amplifier 38 to ground (position 44) during impedance measurements of electrodes 24 and 26, and to couple the output 58 to the summation circuitry 48 (position 46) during full pipe detection. Advantageously, the test signal used in electrode impedance measurement may be the same test signal 32 generated from the same signal source that is used for full pipe detection. Further advantageously, the detection circuitry and the associated filtering circuitry for electrode impedance may be the same as used for flow detection. In the illustrated embodiment, a flow transmitter analog-to-digital converter (not shown) samples the differential electrode signal with a relative high sampling rate (e.g. 9.6 KHz) and the same data is used for electrode impedance and flow detection by using a correlation detection method. Electrode impedance measurement for the electrodes 24 and 26 is useful in gauging various parameters such as conductivity of the medium, gas bubbles in the medium, corrosion of electrodes, fouling of electrodes or liner damage.

The present invention is advantageous in a number of ways. First, the proposed full pipe detection test does not interfere with the flow detection measurement and uses the same circuitry as that used in flow detection and electrode impedance measurement. Furthermore, in the illustrated embodiments, 50 Hz/60 Hz rejection on the full pipe detection is inherent. Also, the proposed full pipe detection works also for remote installation and with very high/low media conductivity.

The present invention thus deals with an electromagnetic flowmeter for measuring the flow of a medium through a measuring pipe. The proposed flowmeter includes first and second electrodes arranged on opposite sides of the measuring pipe and coupled electrically or capacitively to the medium. A common mode test signal is passed to the first and second electrodes. A third electrode is provided at the top of the measuring pipe for receiving a response signal in response to the test signal passed to the first and second electrodes. The flowmeter comprises a detection device for detecting whether the third electrode is in contact with the medium based upon the response signal.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined by the below-mentioned patent claims.

Figure 6:
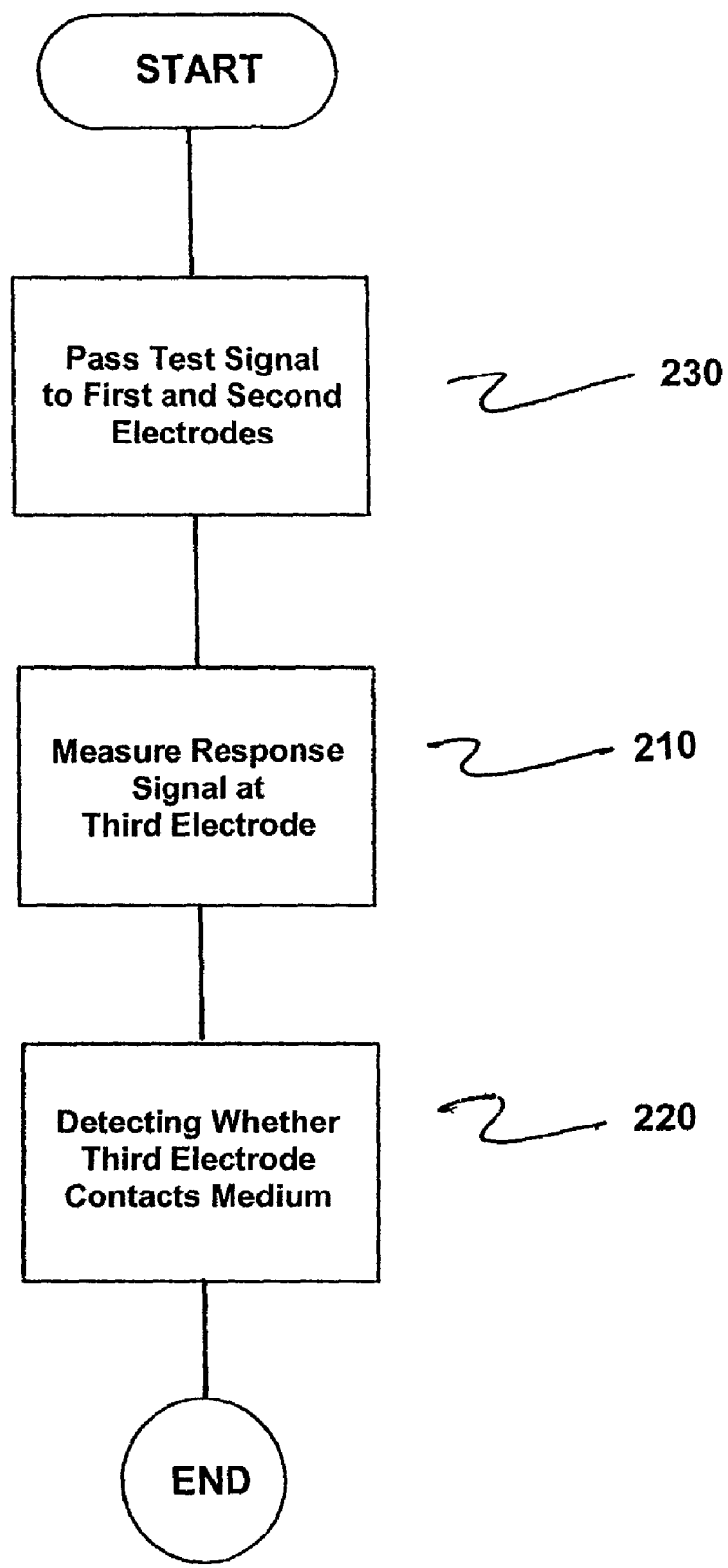
FIG. 6 is a flow chart of the method in accordance with an embodiment of the invention.

FIG. 6 is a flow chart of a method for measuring flow of a medium through a measuring pipe. The method comprises passing a test signal as a common mode signal to first and second electrodes arranged on opposite sides of a measuring pipe and coupled one of electrically and capacitively to said medium, as indicated in step 610. Next, a response signal received at a third electrode arranged at a top of the measuring pipe is measured in response to the test signal passed to the first and second electrodes, as indicated in step 620. A detection is then performed to determine whether the third electrode is in contact with the medium based upon said response signal, indicated in step 630.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:
1. An electromagnetic flowmeter for measuring the flow of a medium through a measuring pipe, comprising:
   first and second electrodes arranged on opposite sides of the measuring pipe and coupled one of electrically and capacitively to the medium;
   a device for passing a test signal as a common mode signal to the first and second electrodes;

a third electrode arranged at a top of the measuring pipe for receiving a response signal in response to the test signal passed to said first and second electrodes; and a detection device for detecting whether said third electrode is in contact with the medium based upon said response signal.

2. The flowmeter according to claim 1, wherein said test signal comprises a sequence of symmetrical pulses having a zero average value over a flow detection period.

3. The flowmeter according to claim 1, wherein said detection device for detecting whether said third electrode is in contact with said medium comprises an impedance detection device for determining an electrode-to-ground impedance of said third electrode, wherein said detection is based on a comparison of the electrode-to-ground impedance determined for said third electrode with an electrode-to-ground impedance of at least one of said first and second electrodes.

4. The flowmeter according to claim 1, further comprising a measuring device for measuring an electrode-to-ground impedance for said first electrode, said measuring device for measuring the electrode-to-ground impedance for said first electrode further comprising:

a current source passing said test signal to said first electrode;

a resistor for terminating the response signal from said third electrode to ground; and a differential amplifier for measuring a potential difference between the first and the second electrode in response to said test signal passed to said first electrode.

5. The flowmeter according to claim 1, wherein said third electrode is terminated to ground via a resistor, the electrode-to-ground impedance of said third electrode being determined by measuring a voltage across said resistor.

6. The flowmeter according to claim 4, wherein said current source is a capacitor.

7. A method for measuring flow of a medium through a measuring pipe, comprising:

passing a test signal as a common mode signal to first and second electrodes arranged on opposite sides of the measuring pipe and coupled one of electrically and capacitively to the medium;

measuring a response signal received at a third electrode arranged at a top of the measuring pipe in response to the test signal passed to the first and second electrodes; and detecting whether the third electrode is in contact with the medium based upon said response signal.

8. The method according to claim 7, wherein said step of detecting whether the third electrode is in contact with the medium comprises determining an electrode-to-ground impedance of the third electrode, wherein said detecting is based on a comparison of the electrode-to-ground impedance determined for the third electrode with an electrode-to-ground-impedance of at least one of the first and second electrodes.

9. The method according to claim 7, further comprising:

measuring an electrode-to-ground impedance for the first electrode, wherein measuring the electrode-to-ground impedance for the first electrode comprises:

passing the test signal to the first electrode;

terminating the response signal from the third electrode to ground; and measuring a potential difference between the first electrode and the second electrode in response to the test signal passed to the first electrode.

10. The method according to claim 8, further comprising:

measuring an electrode-to-ground impedance for the first electrode, wherein measuring the electrode-to-ground impedance for the first electrode comprises:

passing the test signal to the first electrode;

terminating the response signal from the third electrode to ground; and measuring a potential difference between the first electrode and the second electrode in response to the test signal passed to the first electrode.

11. The method according to claims 7, wherein determining the electrode-to-ground impedance of the third electrode comprises terminating the third electrode to ground through a resistor and measuring a voltage across the resistor.

12. The method according to claim 8, wherein determining the electrode-to-ground impedance of the third electrode comprises terminating the third electrode to ground through a resistor and measuring a voltage across the resistor.

13. The method according to claim 9, wherein determining the electrode-to-ground impedance of the third electrode comprises terminating the third electrode to ground through a resistor and measuring a voltage across the resistor.

* * * * *